Nov. 6, 1945.　　　J. M. ANDREAS　　　2,388,591
CONTINUOUS STRIP-HANDLING REEL
Filed Feb. 16, 1944
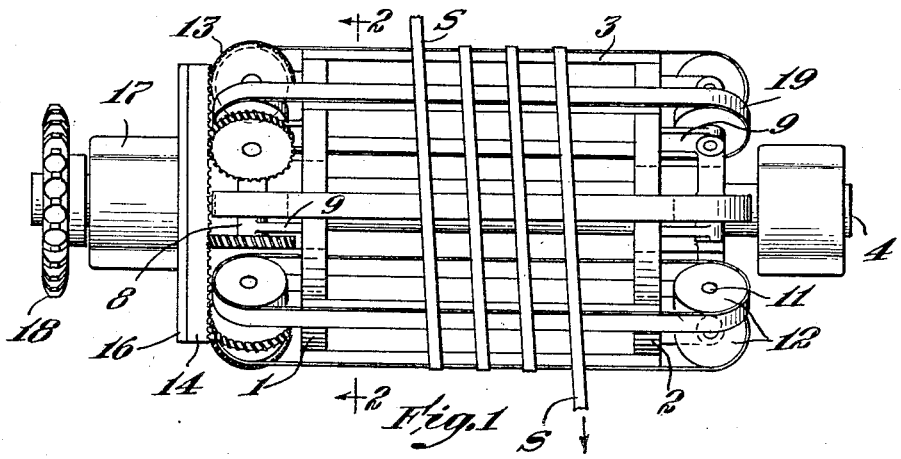
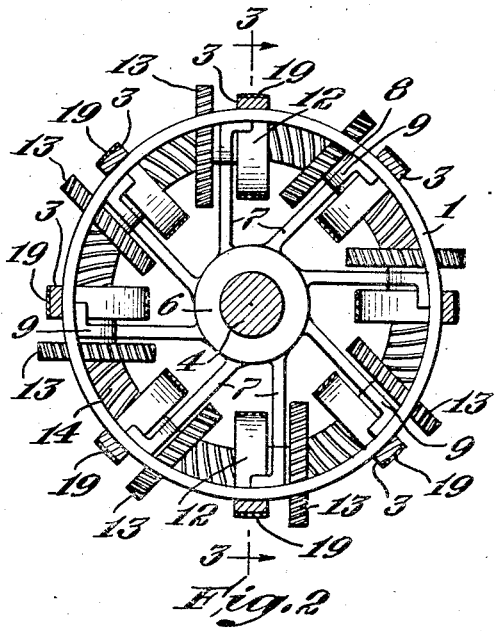
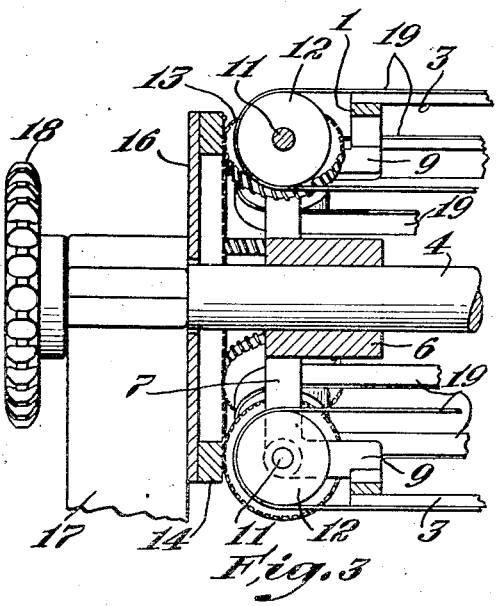
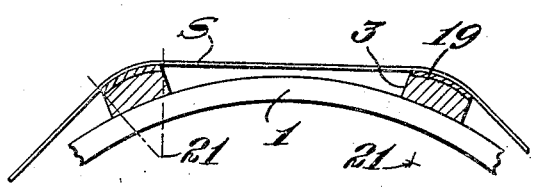
Inventor
John M. Andreas
by Roberts, Cushman & Grover
Att'ys.

Patented Nov. 6, 1945

2,388,591

UNITED STATES PATENT OFFICE 2,388,591

CONTINUOUS STRIP-HANDLING REEL

John M. Andreas, Pasadena, Calif., assignor to Technicolor Motion Picture Corporation, Hollywood, Calif., a corporation of Maine Application February 16, 1944, Serial No. 522,606

4 Claims. (Cl. 28—71.5)

In processing motion picture film it is necessary to feed long lengths of film through liquid baths and then through other stages. For example in printing an imbibition blank from a dye-soaked matrix it is customary to feed the two films separately through liquid baths, thence into face-to-face contact and thence through a path long enough to permit the dye to be imbibed by the blank from the matrix. Likewise in transferring a picture layer from one film base to another it has been proposed to soak the base carrying the layer until the layer is partially loosened, then to feed the two films into contact with each other and thence along a path long enough to permit the layer to adhere to the new base more tightly than to the old, and then to peel the two films apart, leaving the layer adhering to the new base. And in practically all processing it is necessary to dry the long lengths of film after they are completely processed.

One way of drying long lengths of film is to wind the film on large reels and leave the reels stand until the film is dry. However this method has serious disadvantages. For example the reels are bulky and cumbersome, and while the film is standing on the reels the film is likely to collect dust or become damaged.

Another method of drying films is to feed them continuously from the last liquid-treating stage through a drying compartment, the film following a zig-zag course through the compartment. While this method is free from the objections inherent in the aforesaid reel method, it has other disadvantages. For example it is necessary to provide free loops in the drying compartment to compensate for film shrinkage, and even with the usual precautions the films often break or become damaged. Indeed the danger of damage is so great that the use of this method is largely confined to processing positive films which can be replaced if damaged, the original irreplaceable negatives being processed by the cumbersome reel method.

Objects of the present invention are to provide film processing apparatus which is free from the disadvantages of both of the old methods above referred to, which handles film continuously as in the old drying compartment method but which handles the film without danger of breakage as in the old reel method, and to provide an improved method of treating film continuously.

According to the present invention the apparatus comprises a reel whose length is many times the width of the film or other strip, so that many turns of the strip may be wound on the reel, in combination with belting movable lengthwise of the reel along parallel paths on the outside of the reel and returning along inner paths closer to the axis of the reel, together with means for rotating the reel and means for actuating the belting in synchronism with the reel so that the belting progresses lengthwise of the reel more than the width of the strip during each revolution of the reel, whereby a strip may be fed to and from the reel at locations spaced lengthwise of the reel, the film drifting from one location to the other along a spiral path around the reel, while the belting may comprise a single endless belt having spaced lengths in said paths and intermediate lengths crossing from one path to the next path inside the reel, the belting preferably comprises a plurality of endless belts, one for each path.

In a more specific aspect the belting is actuated by the rotation of the reel, thereby to maintain the movement of the belting lengthwise of the reel in synchronism with the rotation of the reel. In the preferred embodiment the apparatus comprises pairs of opposed wheels distributed around the periphery of the drum with the wheels of each pair disposed in the same approximately radial plane at opposite ends of the reel and with the outer sides of the wheels in approximate alignment with the outer periphery of the reel, an endless belt being trained over each pair of wheels with one straight portion extending lengthwise of the reel along the outer periphery and the other straight portion extending inside the reel. The aforesaid wheels may be sprocket wheels having teeth for engagement in perforations in the belts or they may be smooth rollers which drive the belts merely by frictional contact therewith. Preferably the wheels are driven by gears or other rotors fast to the wheels respectively and meshing with a stationary gear or the like mounted along the path of the rotors for turning the rotors about their respective axes as they revolve about the axis of the reel.

For the purpose of illustration a typical embodiment of the invention is shown in the accompanying drawing in which:

Fig. 1 is a side elevation;

Fig. 2 is a section on line 2—2 of Fig. 1;

Fig. 3 is a section on line 3—3 of Fig. 2; and

Fig. 4 is an enlarged cross-sectional detail.

In the particular embodiment of the invention chosen for the purpose of illustration, the reel comprises two end rings 1 and 2, interconnected by longitudinal slats or bars 3, and an axial shaft 4. Fast to the shaft 4 at each end of the reel is a collar 6 having outwardly extending arms 7. At their outer ends the arms have bearings 8 which are connected to the rings 1 and 2 through the medium of arms 9 which extend lengthwise of the reel. Journaled in the bearings 8 are short shafts 11 each of which carries on one end a belt driving wheel 12 and on the other end a rotor in the form of a spiral gear 13. The wheels 12 are mounted in alignment with the slats 3 (Fig. 2) and both the wheels and the gears are fast to the shafts 11. The gears 13 are driven by a stationary spiral gear 14 mounted on a plate 16 fast to the bearing 17 for shaft 4. Mounted on the wheels 12 are the endless belts 19 which are preferably thin ribbons of Monel metal. As shown in Fig. 3 the outer surfaces of the slats 3 are in tangential alignment with the wheel 12. As shown in Fig. 4 the slats and belts are of equal width but the slats may be wider than the belts. For the reason hereinafter explained the outer surface of the slats are preferably convex with a radius of curvature such that the adjacent edges of juxtaposed slats are in tangential alignment. Thus the center of curvature of the slats is indicated at 21 in Fig. 4. The shaft 4 may be driven by any suitable means, as for example sprocket wheel 18 fast to one end of the shaft.

From the foregoing it will be evident that as the reel is rotated the belts are moved lengthwise of the reel by means of the gears 13 and 14. As the gears 13 creep along the stationary gear 14 they are caused to rotate, thereby driving the belts through the medium of the shafts 11 and wheels 12. Thus, as illustrated in Fig. 1, the strip S may be fed to the reel at one location and away from the reel at another location offset lengthwise of the reel. The ratio between the feed of the reel and that of the belts should of course be adjusted so that adjacent turns of the strip do not overlap. By making the slats convex as shown in Fig. 4 the strip S is not flexed sharply at the edges of the slats, the belts being thin enough to conform to the curvature of the slats in response to the pressure of the strip S. While a small reel has been shown for the purpose of illustration, it will of course be understood that the diameter and length of the reel may be as large as desired.

It should be understood that the present disclosure is for the purpose of illustration only and that this invention includes all modifications and equivalents which fall within the scope of the appended claims.

I claim:

1. Cinematographic apparatus for winding film comprising a reel whose length is many times the width of the film, a plurality of endless belts movable along orbital paths extending lengthwise of the reel along the outer periphery thereof and returning inside the reel, means for rotating the reel, and means for actuating the belts in synchronism with the reel so that the belts progress lengthwise of the reel more than the width of said film during each revolution of the reel, whereby a film may be fed to and from the reel at spaced locations lengthwise of the reel, the film drifting from one location to the other along a spiral path around the reel, the spaces between said belts being unobstructed so that the film extends in straight lines from belt to belt without contacting the reel, and each stretch of belt along the outer periphery of the reel being supported by a narrow surface of the reel extending lengthwise of the reel under the belt, said surfaces being convex circumferentially of the reel and said belts being sufficiently flexible to conform to the curvature of the surfaces, whereby the edges of the belts do not damage the film.

2. Cinematographic apparatus for winding film comprising a reel whose length is many times the width of the film, pairs of opposed wheels distributed around the periphery of the reel with the wheels of each pair disposed in the same approximately radial plane at opposite ends of the reel and with the outer sides of the wheels in approximate alignment with the outer periphery of the reel, an endless belt trained over each pair of wheels with one straight portion extending lengthwise of the reel along the outer periphery thereof and the other straight portion extending inside the reel, means for rotating the reel and means for synchronously rotating the wheels so that the belts progress lengthwise of the reel more than the width of said film during each revolution of the reel, whereby a film may be fed to and from the reel at spaced locations lengthwise of the reel, the film drifting from one location to the other along a spiral path around the reel, the spaces between said belts being unobstructed so that the film extends in straight lines from belt to belt without contacting the reel, and each stretch of belt along the outer periphery of the reel being supported by a narrow surface of the reel extending lengthwise of the reel under the belt, said surfaces being convex circumferentially of the reel and said belts being sufficiently flexible to conform to the curvature of the surfaces, whereby the edges of the belts do not damage the film.

3. Cinematographic apparatus for winding film comprising a reel whose length is many times the width of the film, pairs of opposed wheels distributed around the periphery of the reel with the wheels of each pair disposed in the same approximately radial plane at opposite ends of the reel and with the outer sides of the wheels in approximate alignment with the outer periphery of the reel, an endless belt trained over each pair of wheels with one straight portion extending lengthwise of the reel along the outer periphery thereof and the other straight portion extending inside the reel, means for rotating the reel, and means actuated by the rotation of the reel for synchronously rotating the wheels so that the belts progress lengthwise of the reel more than the width of said film during each revolution of the reel, the wheel rotating means comprising rotors fast to the wheels respectively and stationary means mounted along the path of the rotors for turning the rotors about their respective axes as they revolve about the axis of the reel, whereby a film may be fed to and from the reel at spaced locations lengthwise of the reel, the film drifting from one location to the other along a spiral path around the reel, the spaces between said belts being unobstructed so that the film extends in straight lines from belt to belt without contacting the reel, and each stretch of belt along the outer periphery of the reel being supported by a narrow surface of the reel extending lengthwise of the reel under the belt, said surfaces being convex circumferentially of the reel and said belts being sufficiently flexible to conform to the curvature of the surfaces, whereby the edges of the belts do not damage the film.

4. Cinematographic apparatus for winding film comprising a reel whose length is many times the width of the film, endless belting movable lengthwise of the reel along parallel paths on the outside thereof and returning along inner paths closer to the axis of the reel, means for rotating the reel, and means for actuating the belting in synchronism with the reel so that the belting progresses lengthwise of the reel more than the width of said film during each revolution of the reel, whereby a film may be fed to and from the reel at spaced locations lengthwise of the reel, the film drifting from one location to the other along a spiral path around the reel, the spaces between said belts being unobstructed so that the film extends in straight lines from belt to belt without contacting the reel, and each stretch of belt along the outer periphery of the reel being supported by a narrow surface of the reel extending lengthwise of the reel under the belt, said surfaces being convex circumferentially of the reel and said belts being sufficiently flexible to conform to the curvature of the surfaces, whereby the edges of the belts do not damage the film.

JOHN M. ANDREAS.